(12) United States Patent
Salter et al.

(10) Patent No.: US 11,916,420 B2
(45) Date of Patent: Feb. 27, 2024

(54) VEHICLE SENSOR OPERATION

(71) Applicant: Ford Global Technologies, LLC, Dearborn, MI (US)

(72) Inventors: Stuart C. Salter, White Lake, MI (US); Donald Paul Bilger, Livonia, MI (US); Tarik Safir, Chesterfield (GB); John Robert Van Wiemeersch, Novi, MI (US); Zeljko Deljevic, Plymouth, MI (US); Sam Harris, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 17/199,768

(22) Filed: Mar. 12, 2021

(65) Prior Publication Data
US 2022/0294245 A1 Sep. 15, 2022

(51) Int. Cl.
| | |
|---|---|
| H02J 7/00 | (2006.01) |
| G07C 5/00 | (2006.01) |
| G07C 5/08 | (2006.01) |
| B60L 58/14 | (2019.01) |
| B60L 3/00 | (2019.01) |
| H02J 7/34 | (2006.01) |

(52) U.S. Cl.
CPC .......... *H02J 7/0048* (2020.01); *B60L 3/0038* (2013.01); *B60L 58/14* (2019.02); *G07C 5/008* (2013.01); *G07C 5/085* (2013.01); *H02J 7/342* (2020.01)

(58) Field of Classification Search
CPC ....... H02J 7/0048; H02J 7/342; B60L 3/0038; B60L 58/14; G07C 5/008; G07C 5/085; G07C 5/0841
USPC .............................. 320/103, 109, 132; 701/22
See application file for complete search history.

(56) References Cited

U.S. PATENT DOCUMENTS

| | | | |
|---|---|---|---|
| 5,563,576 | A | 10/1996 | Drori et al. |
| 5,581,464 | A | 12/1996 | Woll et al. |
| 7,417,585 | B2 | 8/2008 | Yamagami et al. |
| 8,768,549 | B2 | 7/2014 | Erko et al. |
| 9,266,443 | B2 | 2/2016 | Payne et al. |
| 9,344,683 | B1 | 5/2016 | Nemat-Nasser et al. |
| 9,394,059 | B2 | 7/2016 | Cox et al. |

(Continued)

FOREIGN PATENT DOCUMENTS

| | | |
|---|---|---|
| DE | 102015118874 A1 | 5/2017 |
| WO | 2009094367 A1 | 7/2009 |

(Continued)

OTHER PUBLICATIONS

Final Office Action for U.S. Appl. No. 17/199,805 as issued by the USPTO dated Dec. 6, 2022.

(Continued)

*Primary Examiner* — Zixuan Zhou
(74) *Attorney, Agent, or Firm* — Frank Lollo; Bejin Bieneman PLC (57) ABSTRACT

A charge level of a sensor battery providing power to a sensor in a vehicle is determined. A charge depletion of the sensor battery is determined based on the charge level. A recharge rate to recharge the sensor battery is determined based on a time elapsed on a previously traveled path, a current charge level, and the charge depletion. Upon activation of the vehicle, one or both of a propulsion or a vehicle battery is actuated to recharge the sensor battery at the recharge rate.

20 Claims, 4 Drawing Sheets

(56) References Cited

U.S. PATENT DOCUMENTS

| | | | |
|---|---|---|---|
| 9,412,268 | B2 | 8/2016 | Saptharishi et al. |
| 9,438,868 | B2 | 9/2016 | Boettiger |
| 9,784,229 | B2 | 10/2017 | Holub et al. |
| 9,880,278 | B2 | 1/2018 | van Uifelen et al. |
| 10,600,257 | B2 | 3/2020 | Jiang et al. |
| 10,607,458 | B1 | 3/2020 | Sampson et al. |
| 10,712,742 | B2 | 7/2020 | Valois |
| 10,850,709 | B1 | 12/2020 | Nagata et al. |
| 10,899,317 | B1 | 1/2021 | Moeller et al. |
| 11,099,264 | B2 | 8/2021 | Bhatia et al. |
| 11,104,270 | B1 | 8/2021 | Timms |
| 11,206,465 | B1 | 12/2021 | Krotosky |
| 11,427,143 | B1* | 8/2022 | Linsmeier ............. H02J 7/1438 |
| 11,823,564 | B1 | 11/2023 | Wittevrongel et al. |
| 2003/0030548 | A1 | 2/2003 | Kovacs et al. |
| 2004/0257045 | A1* | 12/2004 | Sada ................ G01R 31/3648 |
| | | | 320/132 |
| 2005/0073433 | A1 | 4/2005 | Gunderson et al. |
| 2005/0193212 | A1 | 9/2005 | Yuhara |
| 2005/0200606 | A1 | 9/2005 | Willemin et al. |
| 2007/0067079 | A1 | 3/2007 | Kosugi |
| 2008/0097664 | A1* | 4/2008 | Aoyama ............. H02J 7/1438 |
| | | | 701/36 |
| 2009/0064696 | A1 | 3/2009 | Perkins |
| 2010/0265344 | A1 | 10/2010 | Velarde et al. |
| 2011/0216200 | A1 | 9/2011 | Chung et al. |
| 2012/0044046 | A1 | 2/2012 | Al-Jafar |
| 2012/0044327 | A1 | 2/2012 | Horita et al. |
| 2012/0188054 | A1 | 7/2012 | Bongard |
| 2013/0117078 | A1 | 5/2013 | Weik, III et al. |
| 2014/0067152 | A1 | 3/2014 | Swanson et al. |
| 2015/0042815 | A1 | 2/2015 | Park et al. |
| 2016/0104325 | A1 | 4/2016 | Lu |
| 2016/0323508 | A1 | 11/2016 | Ayalasomajula et al. |
| 2016/0331192 | A1 | 11/2016 | Rubenson et al. |
| 2016/0332535 | A1 | 11/2016 | Bradley et al. |
| 2016/0356594 | A1 | 12/2016 | Sorenson |
| 2017/0075888 | A1 | 3/2017 | Ekin |
| 2017/0160392 | A1 | 6/2017 | Brisimitzakis et al. |
| 2017/0337435 | A1 | 11/2017 | Uliyar et al. |
| 2018/0053313 | A1 | 2/2018 | Smith |
| 2018/0147986 | A1 | 5/2018 | Chi et al. |
| 2018/0324393 | A1 | 11/2018 | Ryan et al. |
| 2018/0332218 | A1 | 11/2018 | Yoshimura |
| 2019/0102963 | A1 | 4/2019 | Owens et al. |
| 2019/0108010 | A1 | 4/2019 | Tillman et al. |
| 2019/0122460 | A1 | 4/2019 | Reyes et al. |
| 2019/0141419 | A1 | 5/2019 | Xu et al. |
| 2019/0225150 | A1 | 7/2019 | Nohl et al. |
| 2019/0228647 | A1 | 7/2019 | Conde et al. |
| 2019/0249635 | A1 | 8/2019 | Khafagy et al. |
| 2019/0391250 | A1 | 12/2019 | Cohen et al. |
| 2020/0025964 | A1 | 1/2020 | Kubo |
| 2020/0031312 | A1 | 1/2020 | Schat et al. |
| 2020/0033849 | A1 | 1/2020 | Yiu et al. |
| 2020/0114886 | A1 | 4/2020 | Kim |
| 2020/0209377 | A1 | 7/2020 | Ogura et al. |
| 2020/0209869 | A1 | 7/2020 | Toyoura et al. |
| 2020/0247423 | A1 | 8/2020 | Almahmoud et al. |
| 2020/0282921 | A1 | 9/2020 | Herman |
| 2020/0327757 | A1 | 10/2020 | Kelley et al. |
| 2020/0339101 | A1* | 10/2020 | Gantt, Jr. .............. B60W 50/08 |
| 2020/0408876 | A1 | 12/2020 | Weber et al. |
| 2021/0001810 | A1 | 1/2021 | Rivard et al. |
| 2021/0026019 | A1 | 1/2021 | Gahagan et al. |
| 2021/0086761 | A1 | 3/2021 | El Assaad |
| 2021/0092321 | A1 | 3/2021 | Li et al. |
| 2021/0178936 | A1 | 6/2021 | Yetukuri et al. |
| 2021/0223359 | A1 | 7/2021 | Harrison |
| 2021/0245662 | A1 | 8/2021 | Blank et al. |
| 2021/0309183 | A1 | 10/2021 | Bielby et al. |
| 2021/0309257 | A1 | 10/2021 | Roberts et al. |
| 2021/0349204 | A1 | 11/2021 | Brodsky et al. |
| 2022/0123570 | A1 | 4/2022 | Fuchs et al. |
| 2022/0126832 | A1 | 4/2022 | Ewert |
| 2022/0250583 | A1 | 8/2022 | Garg et al. |
| 2023/0056115 | A1 | 2/2023 | Arnold et al. |

FOREIGN PATENT DOCUMENTS

| | | |
|---|---|---|
| WO | 2019013948 A1 | 1/2019 |
| WO | 2021003440 A1 | 1/2021 |

OTHER PUBLICATIONS

Non-Final Office Action for U.S. Appl. No. 17/199,805 as issued by the USPTO dated Aug. 23, 2022.

Non-Final Office Action for U.S. Appl. No. 17/099,869, filed Nov. 17, 2020, as issued by the USPTO dated Mar. 28, 2023.

Non-Final Office Action for U.S. Appl. No. 17/199,954, filed Mar. 12, 2021, as issued by the USPTO dated Jun. 22, 2023.

Non-Final Office Action for U.S. Appl. No. 17/199,688, filed Mar. 12, 2021, as issued by the USPTO dated Jul. 19, 2023.

Notice of Allowance for U.S. Appl. No. 17/099,869, filed Nov. 17, 2020, as issued by the USPTO dated Jul. 13, 2023.

Non-Final Office Action for U.S. Appl. No. 17/199,887, filed Mar. 12, 2021, as issued by the USPTO dated Sep. 13, 2023.

Notice of Allowance for U.S. Appl. No. 17/199,954, filed Mar. 12, 2021, as issued by the USPTO dated Sep. 28, 2023.

Notice of Allowance dated Dec. 28, 2023 re U.S. Appl. No. 17/199,688, filed Mar. 12, 2021.

Notice of Allowance dated Dec. 29, 2023 re U.S. Appl. No. 17/199,887, filed Mar. 12, 2021.

* cited by examiner

VEHICLE SENSOR OPERATION

BACKGROUND

Vehicles can be equipped with computing devices, networks, sensors, and controllers to acquire data regarding the vehicle's environment and to operate the vehicle based on the data. Sensors can provide data to detect features of the environment, such as markings on a road or other travel surface, road signs, objects such as other vehicles or obstacles such as rocks or debris, etc. Sensor data can be provided over a vehicle network to one or more controllers or other computers on the vehicle network. Vehicle sensors can thus provide data as a vehicle travels to a destination, e.g., to determine a path or possible paths to the destination. Sensors can additionally or alternatively be used to provide data about an environment around a vehicle when the vehicle is deactivated and/or not moving.

DETAILED DESCRIPTION

A system includes a computer including a processor and a memory, the memory storing instructions executable by the processor to determine a charge level of a sensor battery providing power to a sensor in a vehicle, determine a charge depletion of the sensor battery based on the charge level, determine a recharge rate to recharge the sensor battery based on a time elapsed on a previously traveled path, a current charge level, and the charge depletion, and upon activation of the vehicle, actuate one or both of a propulsion or a vehicle battery to recharge the sensor battery at the recharge rate.

The instructions can further include instructions to deactivate one or more components of the vehicle to recharge the sensor battery at the recharge rate.

The instructions can further include instructions to, upon receiving user input to deactivate the vehicle, determine that the charge level of the sensor battery is below a threshold and send a request to a user interface to maintain actuation of the propulsion or the vehicle battery to recharge the sensor battery.

The time elapsed on the previously traveled path can be one of a plurality of times on respective previously traveled paths, and the instructions can further include instructions to identify the recharge rate based on a mean of the plurality of times.

The instructions can further include instructions to determine the recharge rate by determining a change in the charge level of the sensor battery from a current charge level to a threshold charge level, and to divide the change in the charge level of the sensor battery by the time elapsed on the previously traveled path.

The instructions can further include instructions to determine the charge depletion as a combined charge depletion of the sensor battery of a plurality of previously traveled paths.

The instructions can further include instructions to determine the recharge rate by determining a charge rate to restore the charge level of the sensor battery above a threshold prior to completion of one and only one traveled path.

The threshold can be based on a decrease in charge level from initiation of a first of the previously traveled paths to an end of a last of the previously traveled paths.

The instructions can further include instructions to, upon detecting deactivation of the vehicle, actuate the sensor to collect data of an environment around the vehicle.

The instructions can further include instructions to reduce a data collection rate of the sensor when the charge level of the sensor battery is below a charge threshold.

The instructions can further include instructions to actuate a second sensor upon detecting deactivation of the vehicle, the second sensor powered by the sensor battery, and to deactivate one of the sensor or the second sensor when the charge level of the sensor battery is below the charge threshold.

The instructions can further include instructions to deactivate the other of the first sensor or the second sensor when an elapsed time from the deactivation of the vehicle exceeds a time threshold.

A method includes determining a charge level of a sensor battery providing power to a sensor, determining a charge depletion of the sensor battery based on the charge level, determining a recharge rate to recharge the sensor battery based on a time elapsed on a previously traveled path, a current charge level, and the charge depletion, and, upon activation of the vehicle, actuating one or both of a propulsion or a vehicle battery to recharge the sensor battery at the recharge rate.

The method can further include deactivating one or more components of the vehicle to recharge the sensor battery at the recharge rate.

The method can further include, upon receiving user input to deactivate the vehicle, determining that the charge level of the sensor battery is below a threshold and sending a request to a user interface to maintain actuation of the propulsion or the vehicle battery to recharge the sensor battery.

The time elapsed on the previously traveled path can be one of a plurality of times on respective previously traveled paths, and the method can further include identifying the recharge rate based on a mean of the plurality of times.

The method can further include determining the recharge rate by determining a change in the charge level of the sensor battery from a current charge level to a threshold charge level, and dividing the change in the charge level of the sensor battery by the time elapsed on the previously traveled path.

The method can further include determining the charge depletion as a combined charge depletion of the sensor battery of a plurality of previously traveled paths.

The method can further include determining the recharge rate by determining a charge rate to restore the charge level of the sensor battery above a threshold prior to completion of one and only one traveled path.

The method can further include, upon detecting deactivation of the vehicle, actuating the sensor to collect data of an environment around the vehicle.

The method can further include reducing a data collection rate of the sensor when the charge level of the sensor battery is below a charge threshold.

The method can further include actuating a second sensor upon detecting deactivation of the vehicle, the second sensor powered by the sensor battery, and deactivating one of the sensor or the second sensor when the charge level of the sensor battery is below the charge threshold.

The method can further include deactivating the other of the first sensor or the second sensor when an elapsed time from the deactivation of the vehicle exceeds a time threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

To detect objects around a vehicle while the vehicle is deactivated, the vehicle can include a set of sensors dedicated to monitoring when the vehicle is deactivated that are powered by a sensor battery separate from the main vehicle battery. The sensors can monitor the vehicle and/or an environment around the vehicle, e.g., in an exposed truck bed, on walkways near the vehicle, etc. Because the sensors are actuated while the vehicle is deactivated, the main vehicle battery and/or the propulsion cannot provide additional power to actuate the sensors. Thus, the sensor battery is relied on to provide the power for the sensors while the vehicle is deactivated. A deactivation period can last for hours, days, or even longer.

To maintain sufficient power in a sensor battery to power the sensors while the vehicle is in a deactivated state, a computer in the vehicle can actuate the propulsion and/or the main vehicle battery to recharge the sensor battery while the vehicle is in operation, e.g., traveling along a path. The computer can determine a specified amount of charge for the sensor battery to power the sensors for a specified period of time during which the vehicle may be deactivated. The computer can determine a recharge rate, i.e., a current supplied by the propulsion (via an alternator or the like) and/or the vehicle battery to restore a charge level of the sensor battery to the specified amount of charge upon or prior to completion of the path traveled by the vehicle. The computer can thus, while traveling along a path prior to vehicle deactivation, restore the sensor battery to power the sensors while the vehicle is deactivated for the specified period of time.

Figure 1:
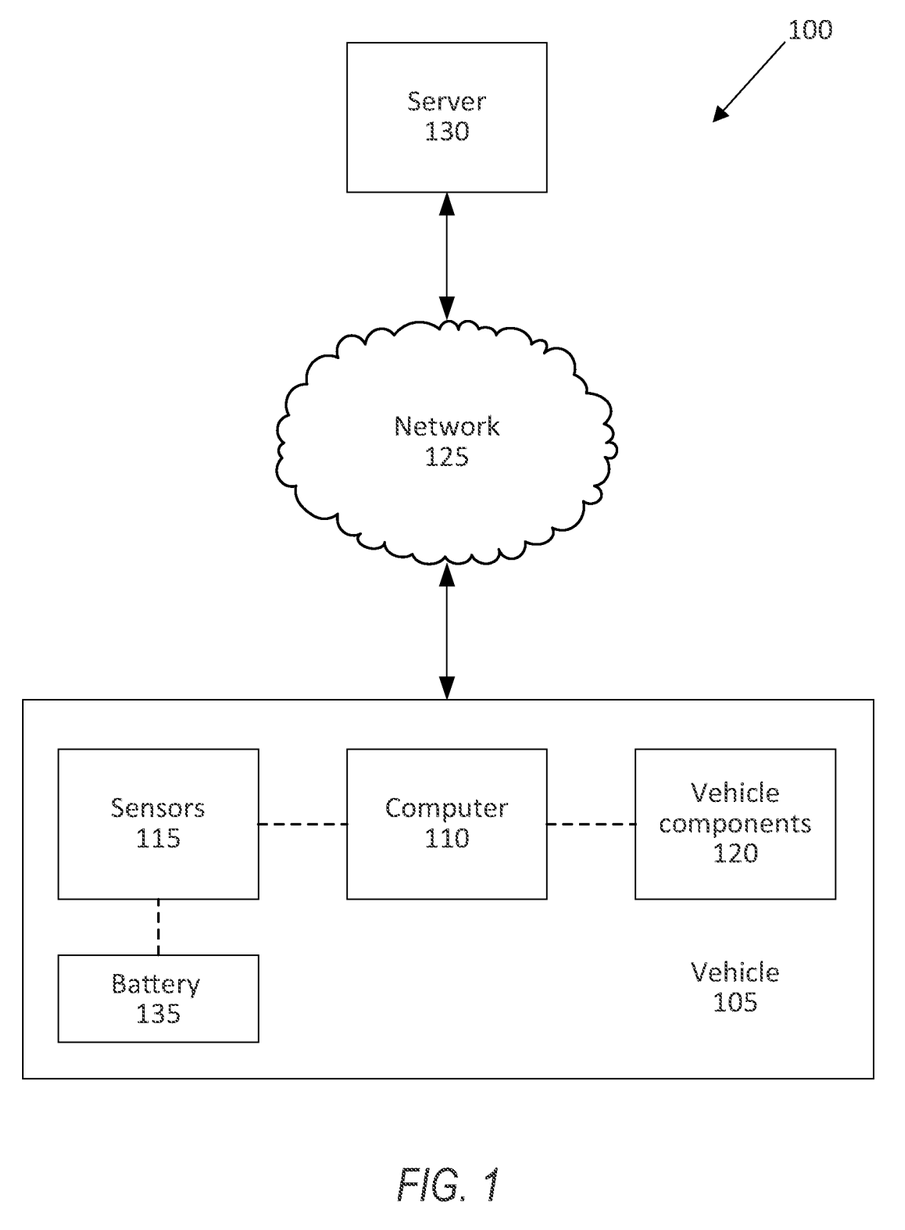
FIG. 1 is a block diagram of an example system for powering sensors in a vehicle.

FIG. 1 illustrates an example system 100 for powering sensors in a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS) and/or dead-reckoning when GPS is not available. Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, Bluetooth®, Ultra-Wideband (UWB), etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include an electronic control unit (ECU) or controller or the like for a specific function or set of functions, and/or a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an authorized user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), UWB, wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), UWB, IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 105 can include one or more sensor batteries 135 that power one or more of the sensors 115. For example, the vehicle 105 can include one battery 135 that powers a set of sensors 115, e.g., sensors 115 that detect objects around the vehicle 105 when the vehicle 105 is deactivated. The sensor battery 135 is an electric power source, e.g., a lithium-ion battery. The sensor battery 135 can provide power to the one or more sensors 115 when the vehicle is deactivated, as described below. One or more components 120 can recharge the sensor battery 135 during operation of the vehicle 105, e.g., a main vehicle battery of an electric vehicle 105, a main vehicle battery of a vehicle 105 with a separate internal combustion engine, a propulsion powering an alternator, etc. The computer 110 can determine a "charge level," i.e., an amount of electricity that the sensor battery 135 can provide to the sensors 115, measured in amp-hours (Ah).

Figure 2:
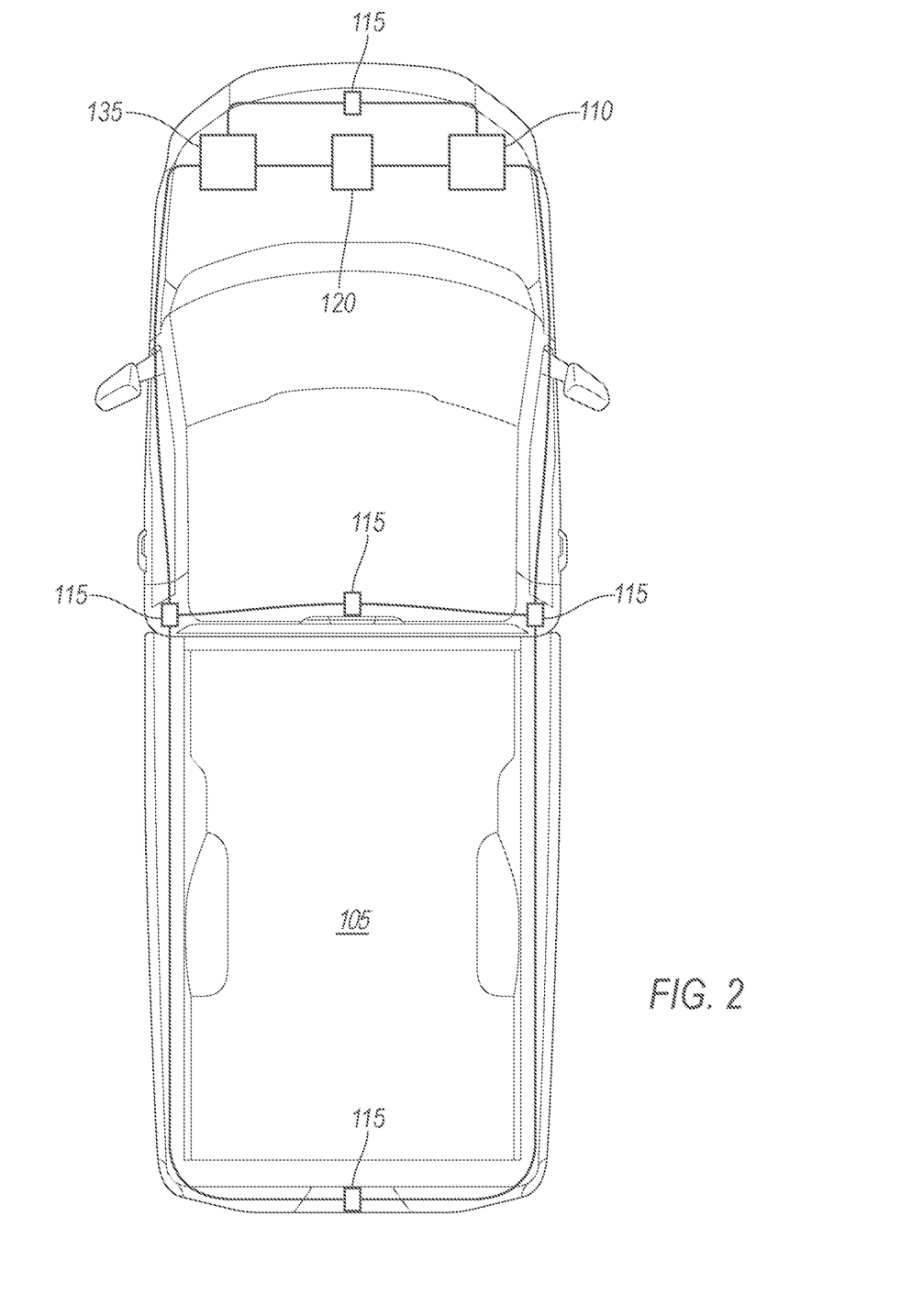
FIG. 2 is a top-down view of the sensors in the vehicle.

FIG. 2 is a top-down view of an example vehicle 105 with a plurality of sensors 115. Each sensor 115 is electrically connected to one or more sensor batteries 135. In the example of FIG. 2, five sensors 115 draw power from a single sensor battery 135. Alternatively, the vehicle 105 can include a different number of sensors 115 (e.g., four, seven, etc.) and a different number of sensor batteries 135 (e.g., two, three, etc.). The sensors 115 can be dedicated sensors 115 programmed to detect objects around the vehicle 105. For example, the sensors 115 can detect a user approaching the vehicle 105 while the vehicle 105 is deactivated. The sensors 115 can include, e.g., image sensors, radar, ultrasonic transducers, capacitance detectors, etc.

The sensors 115 can collect data of an environment around the vehicle 105 when the vehicle 105 is deactivated. That is, the sensors 115 can detect objects approaching the vehicle 105 while the vehicle 105 is deactivated and a user of the vehicle 105 is not present. Collecting data of the environment around the vehicle 105 allows the computer 110 to detect objects around the vehicle. Based on detecting one or more objects, the computer can determine whether the objects are potential threats to the vehicle 105, e.g., objects that may damage the vehicle 105, an intruder that may take items from an exposed bed of the vehicle 105, etc. The computer 110 can provide the collected data to the user of the vehicle 105 via, e.g., the network 125. Alternatively or additionally, the computer 110 can send the collected data to an external server 130 via the network 125, and the server 130 can send the data to the user.

Because the propulsion and/or the vehicle battery is deactivated, the sensors 115 draw power from the sensor battery 135. The sensor battery 135 can power the sensors 115 until the user reactivates the vehicle 105, or until the battery 135 is exhausted. To account for the limited capacity of the sensor battery 135 and to avoid exhausting, i.e., fully depleting, the sensor battery 135, the computer 110 can adjust operation of the sensors 115 to continue to collect data until the user reactivates the vehicle 105. For example, the computer 110 can reduce a data collection rate, e.g., a frequency of scanning, of one or more sensors 115 when the charge level of the sensor battery 135 is below a charge threshold. The charge threshold can be determined based on, e.g., an estimated charge level to power at least one of the sensors 115 for a specified period of time. For example, the charge threshold can be a charge level to power one of the sensors 115 for five days. That is, if the user typically reactivates the vehicle 105 within five days of deactivating the vehicle 105, the computer 110 can determine the charge threshold to power at least one of the sensors 115 for those five days. Reducing the data collection rate reduces the power drawn from the sensor battery 135, and the sensor battery 135 can thus maintain power to at least one of the sensors 115 for a longer period of time than otherwise possible, e.g., until the user reactivates the vehicle 105.

As described above, the computer 110 can actuate more than one sensor 115 upon deactivation of the vehicle, the more than one sensors 115 each drawing power from the sensor battery 135. For example, the computer 110 can actuate a first sensor 115 and a second sensor 115, the "first" and "second" sensors 115 being two of the sensors 115 shown in FIG. 2. Then, when the charge level of the sensor battery 135 is below the charge threshold, the computer can deactivate one of the first sensor 115 or the second sensor 115 to preserve the charge level of the sensor battery 135 to power the other of the first sensor 115 or the second sensor 115. Alternatively or additionally, the computer 110 can deactivate one or both of the first sensor 115 or the second sensor 115 when an elapsed time from the deactivation of the vehicle 105 exceeds a time threshold. As described above, the computer 110 can operate the sensors 115 to collect data from an environment around the vehicle 105 without reducing power or use for the sensors 115 for a specified period of time, e.g., five days. The time threshold can be based on the specified period of time, and when the elapsed time exceeds the time threshold, the computer 110 can deactivate one or more of the sensors 115 to preserve the charge level of the sensor battery 135. For example, the time threshold can be the specified period of time of five days.

Figure 3:
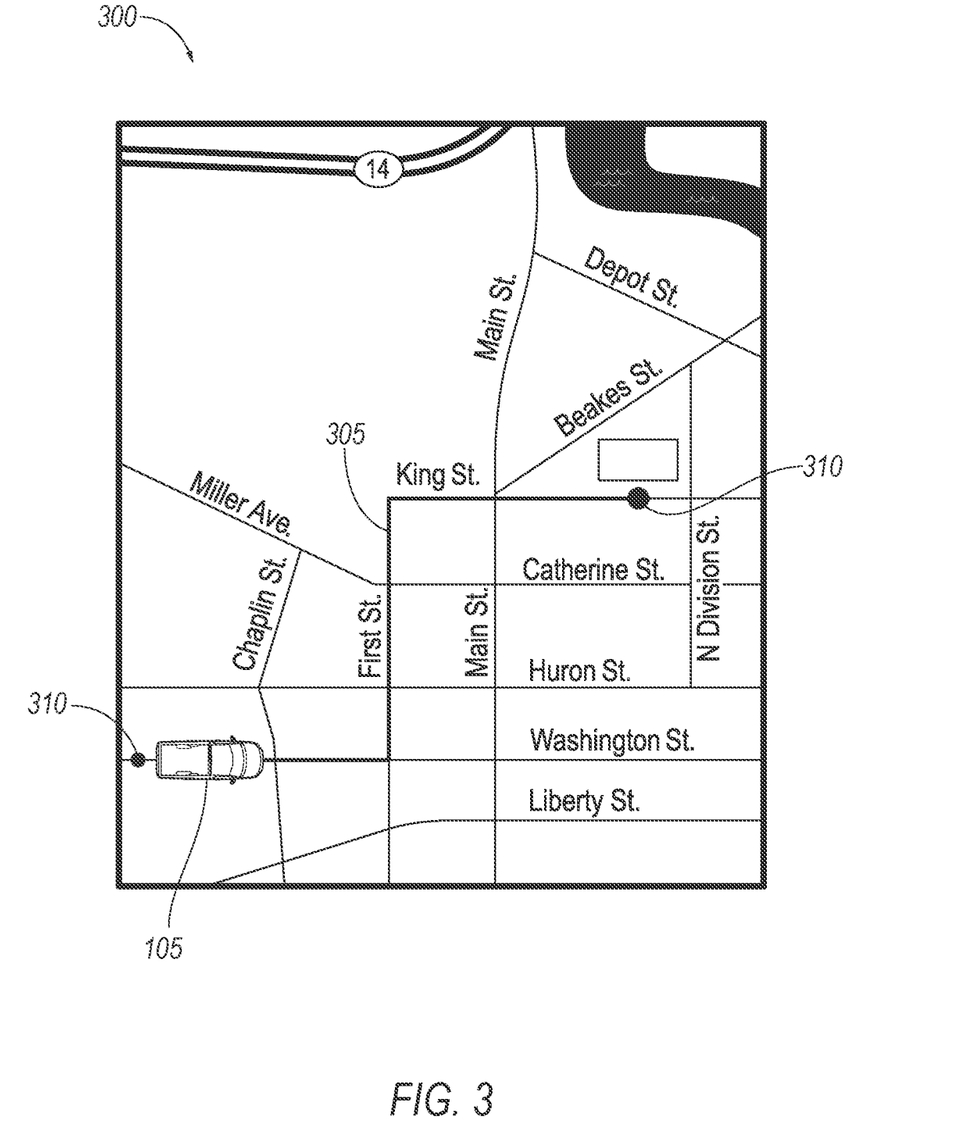
FIG. 3 is a map of a path on which the vehicle travels.

FIG. 3 is a view of an example map 300 illustrating a path 305 along which the vehicle 105 can travel. The "path" 305 is a set of geo-coordinates between endpoints 310 along which the vehicle 105 travels. As the vehicle 105 travels along the path 305, the propulsion and/or the vehicle battery can recharge the sensor battery 135. For example, the propulsion can rotate an alternator that generates electricity supplied to the sensor battery 135. Thus, the sensor battery 135 can be recharged during the path 305.

The computer 110 can determine a time elapsed on the path 305. Upon activation of the vehicle 105, the computer 110 can initiate a timer, and upon deactivation of the vehicle 105, the computer 110 can store the elapsed time since initiation of the timer in the memory. The computer 110 can store the geo-coordinates of the path 305 and associate the elapsed time with the path 305, i.e., the computer 110 can associate each path 305 traveled by the vehicle 105 to the respective elapsed time that the vehicle 105 spent on the path 305. Alternatively or additionally, the computer 110 can determine the time elapsed for each of a plurality of elapsed times on respective previously traveled paths and can determine a mean of the plurality of elapsed times. Yet alternatively or additionally, the computer 110 can transmit each path 305 to an external server 130 that is programmed to determine the elapsed time based on a conventional path analysis or description technique, e.g., a path polynomial, i.e., an equation describing a path of a vehicle 105, a transit time algorithm such as a routing engine that uses contraction hierarchies to predict the time elapsed on a path 305 (such as described as of the time of filing this document at https://eng.uber.com/engineering-routing-engine/), a machine learning model trained to output a time elapsed on an input path 305, etc. For example, the routing engine can model a road network as a graph, with nodes representing intersections and edges representing road segments. Edge weights can represent a metric of interest, e.g., a road segment distance, a time to travel through the segment, etc. The server 130 can use contraction hierarchies with a sharding algorithm that divides the graph into shards to predict the transit time elapsed on the path 305.

The computer 110 can determine a charge depletion of the sensor battery 135. A "charge depletion" is a change of the charge level to power the sensors 115 from a first charge level (e.g., fully charged) to a second, lesser, charged level. A charge depletion is measured in units of electric charge, e.g., ampere-hours. That is, as the sensor battery 135 powers the sensors 115, the computer 110 can determine the amount that the charge level of the sensor battery 135 depletes from deactivation following a first path 305 to activation to follow a second path 305. The computer 110 can determine the charge depletion CD as a difference between (a) a first charge level $C_d$ of the sensor battery 135 determined upon deactivation of the vehicle 105 upon completing a path 305, and (b) a second charge level $C_a$ of the sensor battery 135 determined upon activation of the vehicle 105 to travel on a new path 305:

$$CD = C_d - C_a \quad (1)$$

The computer 110 can determine a recharge rate to recharge the vehicle battery 135. A "recharge rate" is a change of the charge level per unit time to increase the charge level to a predetermined charge threshold measured in units of current, e.g., amperes. The charge threshold can be an amount of charge to power the sensors 115 for a specified period of time, as described above. For example, the charge threshold can be a sum of charge depletions CD for a specified period of time and/or a specified number of paths 305, e.g., a sum of charge depletions CD in a period of five days. The recharge rate R can be based on the time elapsed on a previously traveled path $T_p$, as described above, a current charge level $C_0$, and the charge threshold $C_{total}$:

$$R = \frac{C_{total} - C_0}{T_p} = \frac{\sum_i CD_i - C_0}{T_p} \quad (2)$$

where $CD_i$ is each charge depletion CD between a deactivation of the vehicle 105 and a next activation of the vehicle 105. As described above, the time elapsed $T_p$ can be a time elapsed on a single path 305 or a mean of a plurality of elapsed times for a respective plurality of paths 305. The recharge rate R can be determined to return the charge level of the sensor battery 135 to the charge threshold $C_{total}$ upon completion of one path 305 traveled by the vehicle 105. Thus, the computer 110 can determine to recharge the sensor battery 135 during travel along one path 305 to power the sensors 115 for a specified period of time, e.g., five days.

Upon activation of the vehicle 105 to travel along a path 305, the computer 110 can actuate one or more vehicle components 120, e.g., one or both of a propulsion or a vehicle battery, to recharge the sensor battery 135 at the recharge rate. The propulsion can provide power to the sensor battery 135 via an alternator, and the vehicle battery can provide power to the sensor battery 135 directly. The computer 110 can determine a current supplied to the sensor battery 135, compare the supplied current to the recharge rate, and adjust the propulsion and/or the vehicle battery until the supplied current is at least the recharge rate. That is, the computer 110 can operate the propulsion and/or the vehicle battery to provide current at the recharge rate to the sensor battery 135 to restore the charge level of the sensor battery 135 to the charge threshold upon completion of the path 305. Thus, the computer 110 can recharge the sensor battery 135 to the charge threshold on one and only one path 305.

Additionally or alternatively, the computer 110 can deactivate one or more components 120 of the vehicle to recharge the sensor battery 135 at the recharge rate. The components 120 can draw power from the propulsion and/or the vehicle battery, decreasing the current supplied to recharge the sensor battery 135. To attain the recharge rate, the computer 110 can deactivate one or more of the components 120, reducing the power drawn by the components 120 and increasing the current supplied to the sensor battery 135. For example, the computer 110 can deactivate an entertainment subsystem (e.g., a radio, a display screen, etc.). In another example, the computer 110 can throttle processing speed of a processor of the computer 110, i.e., setting a maximum rate of computations performed by the computer, thereby reducing power used by the computer 110. In yet another example, if the computer 110 communicates with the server 130, the computer 110 can identify an external Wi-Fi network 125 that is not powered by the vehicle 105 and communicate with the server 130 via the Wi-Fi network 125 instead of a conventional external network 125 (e.g., a cellular LTE network) that may use more power than the Wi-Fi network 125.

The computer 110 can receive user input to deactivate the vehicle 105 before the charge level of the sensor battery 135 has reached the charge threshold. For example, the path 305 followed by the user may be shorter than the previous paths 305, and thus the vehicle 105 may spend less time on a current path 305 than on a previous path 305. Because the recharge rate is based on the time elapsed on previous paths 305, a shorter path 305 than the previous paths 305 would not recharge the sensor battery 135 to the charge threshold at the determined recharge rate. The computer 110 can send a request to a user interface to maintain actuation of the propulsion and/or the vehicle battery to recharge the sensor battery 135 to the charge threshold. The "user interface" is a device or other interface by which the user can provide input to the computer 110, e.g., a display screen in the vehicle 105, a remote device such as a smartphone or tablet, etc. Upon receiving input to recharge the sensor battery 135 in response to the request, the computer 110 can maintain actuation of the propulsion and/or the vehicle battery until the charge level of the sensor battery 135 exceeds the charge threshold. If the user provides input not to recharge the sensor battery 135, the computer 110 deactivates the propulsion and/or the vehicle battery and, upon a next activation of the vehicle 105, actuates the propulsion and/or the vehicle battery to recharge the sensor battery 135 at the recharge rate.

Figure 4:
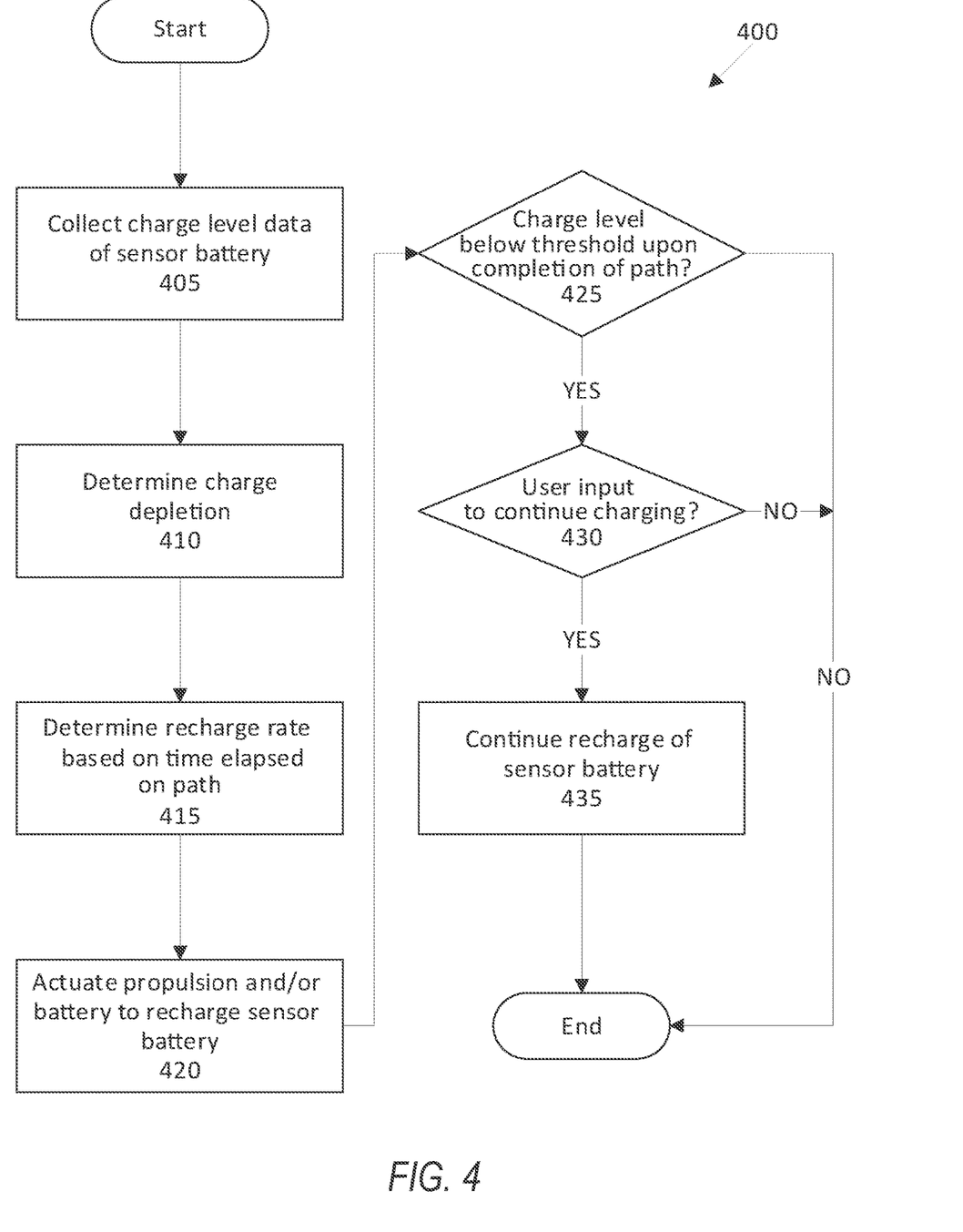
FIG. 4 is a block diagram of an example process for powering sensors in the vehicle.

FIG. 4 is a block diagram of an example process 400 for maintaining charge of a sensor battery 135 in a vehicle 105. The process 400 begins in a block 405, in which a computer 110 collects charge level data of the sensor battery 135. The sensor battery 135 powers one or more sensors 115 while the vehicle 105 is deactivated. As described above, the computer 110 can receive charge level data from the sensor battery 135 as the one or more sensors 115 draw power from the sensor battery 135.

Next, in a block 410, the computer 110 determines a charge depletion of the sensor battery 135. As described above, the charge depletion is the change in the charge level data of the sensor battery 135 from a deactivation of the vehicle 105 until a next activation of the vehicle 105. That is, the charge depletion is an amount of charge depleted from the sensor battery 135 while the vehicle 105 is deactivated.

Next, in a block 415, the computer 110 determines a recharge rate based on a time elapsed on a path 305. As described above, the vehicle 105 travels along the path 305, and the computer 110 can determine the time elapsed while the vehicle 105 traveled along the path 305. The recharge rate is a rate of charging at which, when power is supplied to the sensor battery 135, the charge level of the sensor battery 135 is predicted to reach or exceed a charge threshold within the time elapsed on the path 305. The recharge rate can be, e.g., the charge depletion divided by the elapsed time.

Next, in a block 420, the computer 110 actuates a propulsion and/or a vehicle battery to recharge the sensor battery 135 at the recharge rate. As described above, the computer 110 can increase output from the propulsion to attain the recharge rate. That is, the computer 110 can determine a current supplied to the sensor battery 135 by the propulsion and/or the vehicle battery and, when the current is below the recharge rate, increase output of the propulsion and/or the vehicle battery until the current supplied to the sensor battery 135 is at least the recharge rate. Alternatively or additionally, the computer 110 can deactivate one or more components 120, such as an entertainment subsystem, to reduce power consumed by the components 120 and to provide that power to the sensor battery 135.

Next, in a block 425, the computer 110 determines, upon completing the path 305, whether the charge level of the sensor battery 135 is below the charge threshold. As described above, the computer 110 determines the recharge rate to increase the charge level of the sensor battery 135 to the charge threshold upon completion of one path 305. However, as noted above, a user of the vehicle 105 may operate the vehicle 105 on a shorter path 305 than previously traveled paths 305, decreasing the amount of time elapsed on the path 305 and the time for the sensor battery 135 to recharge. If the charge level of the sensor battery 135 is below the charge threshold upon completion of the path 305, the process 400 continues in a block 430. Otherwise, the process 400 ends.

In the block 430, the computer 110 determines whether the user has provided input to continue recharging the sensor battery 135. As described above, the computer 110 can provide a request to a user interface, such as a display screen, to continue operation of the propulsion and/or the vehicle battery to recharge the sensor battery 135. The user can provide input to the user interface to allow the computer 110 to continue recharging the sensor battery 135. If the user provides input to continue charging, the process 400 continues in a block 435. Otherwise, the process 400 ends.

In the block 435, the computer 110 maintains actuation of the propulsion and/or the vehicle battery until the charge level of the sensor battery 135 exceeds the charge threshold. When the charge level of the sensor battery 135 exceeds the charge threshold, the computer 110 deactivates the propulsion and/or the vehicle battery. The sensor battery 135 then powers the sensors 115 while the vehicle 105 is deactivated, as described above. Following the block 435, and the process 400 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising a computer including a processor and a memory, the memory storing instructions executable by the processor to:
   determine a charge level of a sensor battery providing power to a sensor in a vehicle;
   determine a charge depletion of the sensor battery based on the charge level;
   determine a recharge rate to recharge the sensor battery based on a time elapsed on a previously traveled path, a current charge level, and the charge depletion; and
   upon activation of a vehicle, actuate one or both of a propulsion or a vehicle battery to recharge the sensor battery at the recharge rate.

2. The system of claim 1, wherein the instructions further include instructions to deactivate one or more components of the vehicle to recharge the sensor battery at the recharge rate.

3. The system of claim 1, wherein the instructions further include instructions to, upon receiving user input to deactivate the vehicle, determine that the charge level of the sensor battery is below a threshold and send a request to a user interface to maintain actuation of the propulsion or the vehicle battery to recharge the sensor battery.

4. The system of claim 1, wherein the time elapsed on the previously traveled path is one of a plurality of times on respective previously traveled paths, and the instructions further include instructions to identify the recharge rate based on a mean of the plurality of times.

5. The system of claim 1, wherein the instructions further include instructions to determine the recharge rate by determining a change in the charge level of the sensor battery from a current charge level to a threshold charge level, and to divide the change in the charge level of the sensor battery by the time elapsed on the previously traveled path.

6. The system of claim 1, wherein the instructions further include instructions to determine the charge depletion as a combined charge depletion of the sensor battery of a plurality of previously traveled paths.

7. The system of claim 6, wherein the instructions further include instructions to determine the recharge rate by determining a charge rate to restore the charge level of the sensor battery above a threshold prior to completion of one and only one traveled path.

8. The system of claim 7, wherein the threshold is based on a decrease in charge level from initiation of a first of the previously traveled paths to an end of a last of the previously traveled paths.

9. The system of claim 1, wherein the instructions further include instructions to, upon detecting deactivation of the vehicle, actuate the sensor to collect data of an environment around the vehicle.

10. The system of claim 9, wherein the instructions further include instructions to reduce a data collection rate of the sensor when the charge level of the sensor battery is below a charge threshold.

11. The system of claim 9, wherein the instructions further include instructions to actuate a second sensor upon detecting deactivation of the vehicle, the second sensor powered by the sensor battery, and to deactivate one of the sensor or the second sensor when the charge level of the sensor battery is below the charge threshold.

12. The system of claim 11, wherein the instructions further include instructions to deactivate the other of the sensor or the second sensor when an elapsed time from the deactivation of the vehicle exceeds a time threshold.

13. A method, comprising:
   determining a charge level of a sensor battery providing power to a sensor;
   determining a charge depletion of the sensor battery based on the charge level;
   determining a recharge rate to recharge the sensor battery based on a time elapsed on a previously traveled path, a current charge level, and the charge depletion; and
   upon activation of a vehicle, actuating one or both of a propulsion or a vehicle battery to recharge the sensor battery at the recharge rate.

14. The method of claim 13, further comprising deactivating one or more components of the vehicle to recharge the sensor battery at the recharge rate.

15. The method of claim 13, further comprising, upon receiving user input to deactivate the vehicle, determining that the charge level of the sensor battery is below a threshold and sending a request to a user interface to maintain actuation of the propulsion or the vehicle battery to recharge the sensor battery.

16. The method of claim 13, wherein the time elapsed on the previously traveled path is one of a plurality of times on respective previously traveled paths, and the method further comprises determining the recharge rate based on a mean of the plurality of times.

17. The method of claim 13, further comprising determining the charge depletion as a combined charge depletion of the sensor battery of a plurality of previously traveled paths and identifying the recharge rate based on the combined charge depletion.

18. The method of claim 17, further comprising determining the recharge rate by determining a charge rate to restore the charge level of the sensor battery above a threshold prior to completion of one and only one traveled path.

19. The method of claim 13, further comprising, upon detecting deactivation of the vehicle, actuating the sensor to collect data of an environment around the vehicle.

20. The method of claim 19, further comprising actuating a second sensor upon detecting deactivation of the vehicle, the second sensor powered by the sensor battery, and deactivating one of the sensor or the second sensor when the charge level of the sensor battery is below the charge threshold.

* * * * *